J. A. POWER.
TRIPLE PURIFICATION WATER STILL.
APPLICATION FILED APR. 21, 1910.
988,661.
Patented Apr. 4, 1911.
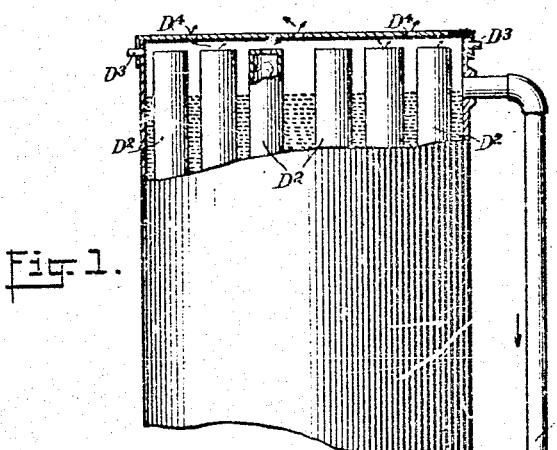
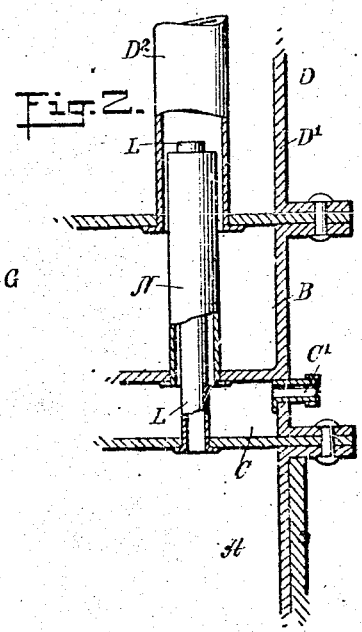
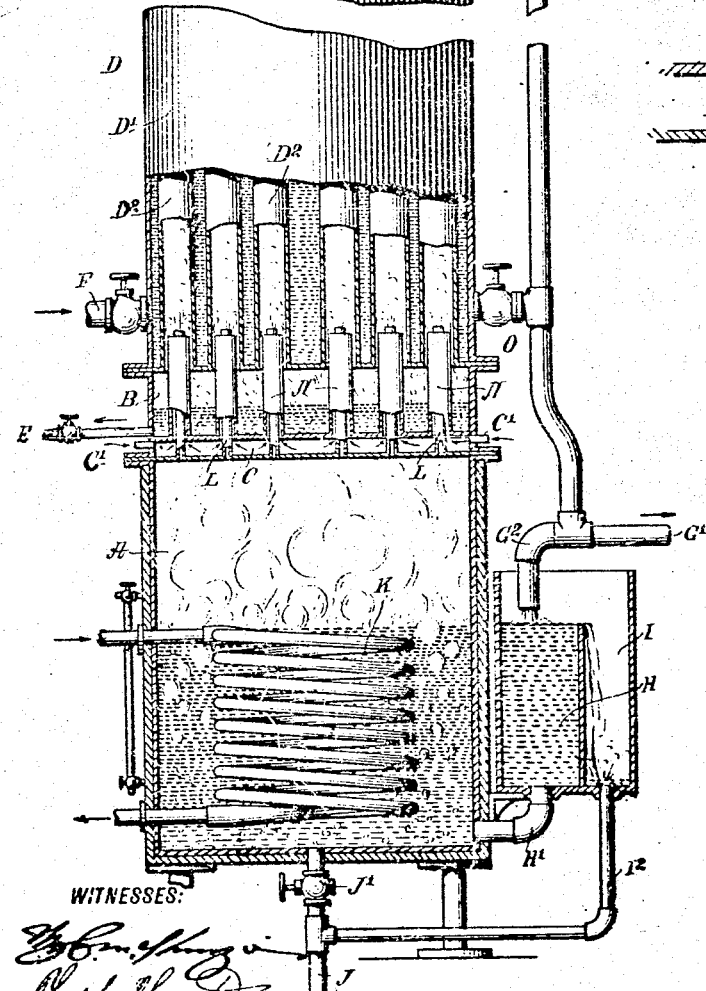
WITNESSES:
INVENTOR
John A. Power,
BY
ATTORNEYS

UNITED STATES PATENT OFFICE.

JOHN A. POWER, OF BABYLON, NEW YORK.

TRIPLE-PURIFICATION WATER-STILL.

988,661.

Specification of Letters Patent.

Patented Apr. 4, 1911.

Application filed April 21, 1910. Serial No. 556,684.

*To all whom it may concern:*

Be it known that I, JOHN A. POWER, a citizen of the United States, and resident of Babylon, in the county of Suffolk and State of New York, have invented a new and Improved Triple-Purification Water-Still, of which the following is a full, clear, and exact description.

The invention relates to multiple condenser water stills, such, for instance, as shown and described in the Letters Patent of the United States, No. 878,744, granted to me February 11, 1908.

The object of the invention is to provide a new and improved triple purification water still, arranged to insure a continuous operation and to subject the water to distinct purification processes, with a view to eliminate volatile gases, sediment and other extraneous matter, at the same time aerating the water to produce a pure, delicious and palatable water a comparatively low cost.

For the purpose mentioned, use is made of an evaporator and an air heating chamber having an air inlet and an air outlet, and means for producing a suction action in the said air heating chamber by the vapors arising from the said evaporator, to cause the heated air to commingle with the said vapors to insure a thorough aeration of the vapors and consequently of the water of condensation.

A practical embodiment of the invention is represented in the accompanying drawings forming a part of this specification, in which similar characters of reference indicate corresponding parts in both views.

Figure 1 is a sectional side elevation of the water still, part being in elevation; and Fig. 2 is an enlarged sectional side elevation of part of the same.

In the general construction of the water still, use is made of an evaporator A, a distilled water reservoir B, an air-heating and sterilizing chamber C interposed between the top of said evaporator A and the bottom of the said reservoir B, and on the top of the latter is arranged a condenser D having a shell D', and condenser tubes D² secured in the bottom of the shell D' and opening at their lower ends into the distilled water reservoir B, so that the water of condensation within the said tubes D² flows down the same and into the reservoir B, from which it is drawn off through a valved pipe E. The upper open ends of the tubes D² terminate immediately below the top of the shell D', and in the upper portion of the shell D' are arranged escape pipes D³ for the escape of volatile gases due to the presence of organic matter in the water, and in the top of the shell D' are arranged openings D⁴, for carrying off extraneous vapors passing through the upper open ends of the tubes D².

Raw water is supplied to the condenser D at the lower portion of its shell D' by the use of a valved pipe F connected with a suitable source of water supply, and from the upper portion of the shell D', a distance below the upper open ends of the tubes D², extends an overflow pipe G, leading downwardly and serving to maintain the level of the water in the condenser shell D' a distance below the upper ends of the condenser tubes D² and the escape pipes D³, as plainly indicated in Fig. 1. The pipe G has a branch pipe G' leading to a sewer or other suitable place of discharge, and the terminal G² of the pipe G discharges into a water tank H arranged alongside the evaporator A and connected with the same near the bottom by a pipe H' to supply the evaporator A with water, and to maintain the level of the water in the evaporator A corresponding to the top of the tank H, which latter overflows into the overflow tank I, connected at its bottom by a pipe I² with a pipe J, connected with the bottom of the evaporator A and having a valve J' normally closed. The pipes G' and G² are properly proportioned to supply the requisite flow of water, the surplus being taken to the sewer by the pipe G'. The pipe J leads to a sewer or other suitable place of discharge, and the pipe J serves as a drain pipe for the tank I and also as a blow-out pipe for any sediment settling in the evaporator A, it being understood that for this purpose the valve J' is opened, say after a day's use of the still, to drain the evaporator A of its water and the sediment settling in the bottom thereof. After this is done, the valve J' is closed and the evaporator A is refilled with water from the tank H at the time the still is started at the next run.

In order to heat the water in the evaporator A, use is preferably made of a steam coil K, connected with a boiler or other suitable source of steam supply, the coil being submerged in the water contained in the evaporator A. The vapors arising from the heated water contained in the evaporator A pass through pipes L extending from the top of the evaporator and passing into pipes N rising from the bottom of the distilled water reservoir B, the pipes N opening at their lower ends into the air-heating chamber C, and the upper ends of the pipes L and N extend into the lower portions of the condenser tubes $D^2$. Sufficient space is left between the pipes L and N for the heated air in the chamber C to pass through the said space into the corresponding condenser tube $D^2$, it being understood that vapors passing through the pipes L cause a suction in the pipes N, thus drawing the heated air out of the chamber C into the tubes $D^2$ to commingle with the vapors passing into the tubes $D^2$ by the pipes L. Each pipe N is spaced from its tube $D^2$ sufficient to allow the water of condensation on the inner surface of the tube $D^2$ to flow downward into the reservoir B to collect therein. The air-heating chamber C is provided with inlet pipes C', preferably covered with wire netting (see Fig. 2), to prevent impurities from passing with the air into the chamber C. Now as the chamber C is intermediate the evaporator A and the reservoir B, it is evident that the air passing into the chamber C from the outside is highly heated and sterilized and is forced through the pipes N to commingle with the vapors having approximately the same temperature as the heated air. Thus the vapors are thoroughly aerated and consequently the water of condensation flowing down the tubes $D^2$ into the reservoir B.

When the still is in use, raw water passing into the condenser D reaches gradually the temperature of about 200° F. owing to the heat radiated from the tubes $D^2$, the temperature mentioned being attained at or near the level of the water in the shell D', at which point the water overflows into the pipe G, to finally pass into the tank H and into the evaporator A, in which the water is brought to the boiling point. As the water is highly heated before reaching the evaporator A, it is evident that it takes a comparatively short time and little heat from the coil K to bring it to the boiling point. Now any volatile gases contained in the water passing into the shell D' are separated from the water and pass out through the escape pipes $D^3$, and any sediment contained in the water passing into the evaporator A settles therein, to be drawn off periodically through the pipe J, and any extraneous matter contained in the vapors passing up through the tubes $D^2$ can readily pass out of the same into the top of the condenser shell D' and out through the escape openings $D^4$. The condenser shell D' may be flushed at the end of a day's run by opening a valved connection O connecting the lower end of the shell D' with the pipe G, it being understood that when this flushing takes place the valve J' is also opened to flush the evaporator A.

The water still shown and described is very simple and can be cheaply constructed, and a great saving of heat units is effected by utilizing the vapors in the tubes $D^2$ for heating the incoming raw water and delivering this heated water to the evaporator A, so that it requires but little heat from the coil K to cause the water to boil in the evaporator. It will also be noticed that by arranging the air-heating chamber C immediately above the evaporator A, the said chamber is highly heated, to properly heat and sterilize the air drawn into the tubes $D^2$ by the suction action of the vapors passing from the evaporator A by way of the pipes L into the tubes $D^2$.

It is understood that when the still is in use, the raw water flows continually into the condenser shell D', to be heated therein by the heat radiating from the condenser tubes $D^2$, the heated water overflowing finally by way of the pipe G, while the volatile gases liberated within the shell D' escape by way of the escape pipes $D^3$. A portion of the water passing down the pipe G is drained off by the branch pipe G', and the remainder passes into the tank H, which supplies the evaporator A with water, to maintain a constant level of the water in the evaporator, as before explained. The vapors of the now boiling water in the evaporator pass through the pipes L into the condenser tubes $D^2$ to heat the same and at the same time produce a suction action in the air-heating and sterilizing chamber C, to draw air from the outside into the said chamber, in which latter the air is heated and drawn up the pipes N into the condenser tubes $D^2$ to commingle with the vapors and thus aerate the same. It is understood that by heating the air, the affinity of the air to commingle with the vapors is greatly increased, and hence a thorough aeration takes place. The aerated vapors condensing in the tubes $D^2$ flow down the latter into the distilled water reservoir B, from which the water is withdrawn as required. Sediment in the water is precipitated in the evaporator A, and extraneous matter in the rising vapors in the condenser tubes can readily escape by way of the escape openings $D^4$.

From the foregoing, it will be seen that the operation is continuous and a large quantity of aerated distilled water is produced at a correspondingly low cost.

In case it is desired not to aerate the water or other liquid, then caps are placed over the air inlets C', thus preventing air from passing into the chamber.

Having thus described my invention, I claim as new and desire to secure by Letters Patent:

1. A water still, comprising an evaporator having vapor outlets, an air heating chamber located above the evaporator and having an air inlet and heated air outlets extending from the top of said chamber, and a condenser having condenser tubes, an air outlet and a vapor outlet extending into each condenser tube, the vapor outlets being arranged relatively to the air outlets for producing a suction action in the said air heating chamber by the vapors arising from the said evaporator and commingling the heated air with the vapors.

2. A water still, comprising an evaporator having vapor outlets for the passage of the vapors generated in the said evaporator, a distilled water reservoir, an air heating chamber interposed between the top of the said evaporator and the bottom of said reservoir, the said air heating chamber having an air inlet and heated air outlets, and a condenser having condenser tubes opening into the said reservoir, an air outlet and a vapor outlet extending into each of said condenser tubes.

3. A water still, comprising an evaporator provided with vapor outlet pipes at its top, a distilled water reservoir, an air-heating chamber interposed between the evaporator and the reservoir and having an air inlet, and air outlet pipes extending from the top of said air chamber, the heated air outlet pipes and the vapor outlet pipes extending through the said reservoir, the said vapor outlet pipes also extending through the air heating chamber and through the center of said air outlet pipes and spaced therefrom to produce a suction action in the said air heating chamber, and a condenser having a shell and condenser tubes, the said condenser tubes opening at their lower ends into the said reservoir, the upper ends of the said air outlet pipes and vapor outlet pipes extending into the lower ends of the said condenser tubes, the air outlet pipes being spaced from the walls of the condenser tubes.

4. A water still, comprising an evaporator having vapor outlets for the passage of the vapors generated in the said evaporator, a distilled water reservoir, an air-heating chamber interposed between the said evaporator and the said reservoir, the said air-heating chamber having an air inlet and heated air outlets opening into the said evaporator outlets for the latter to produce a suction action in the said air-heating chamber, the said vapor outlets and the said heated air outlets extending through the said reservoir, and a condenser superimposed on the said reservoir and having a condenser shell and condenser tubes opening at their lower ends into the said reservoir, the said vapor outlets and the said heated air outlets extending into the lower ends of the said condenser tubes.

5. A water still, comprising an evaporator having vapor outlets for the passage of the vapors generated in the said evaporator, a distilled water reservoir, an air-heating chamber interposed between the said evaporator and the said reservoir, the said air-heating chamber having an air inlet and heated air outlets opening into the said evaporator outlets for the latter to produce a suction action in the said air-heating chamber, the said vapor outlets and the said heated air outlets extending through the said reservoir, and a condenser superimposed on the said reservoir and having a condenser shell and condenser tubes opening at their lower ends into the said reservoir, the said vapor outlets and the said heated air outlets extending into the lower ends of the said condenser tubes, the said condenser tubes terminating with their upper open ends below the top of the condenser shell and the upper end of the latter being provided with outlets for extraneous vapors rising from the water in the condenser shell and those rising in the condenser tubes.

In testimony whereof I have signed my name to this specification in the presence of two subscribing witnesses.

JOHN A. POWER.

Witnesses:
 THEO. G. HOSTER,
 PHILIP D. ROLLHAUS.